Patented Apr. 19, 1932

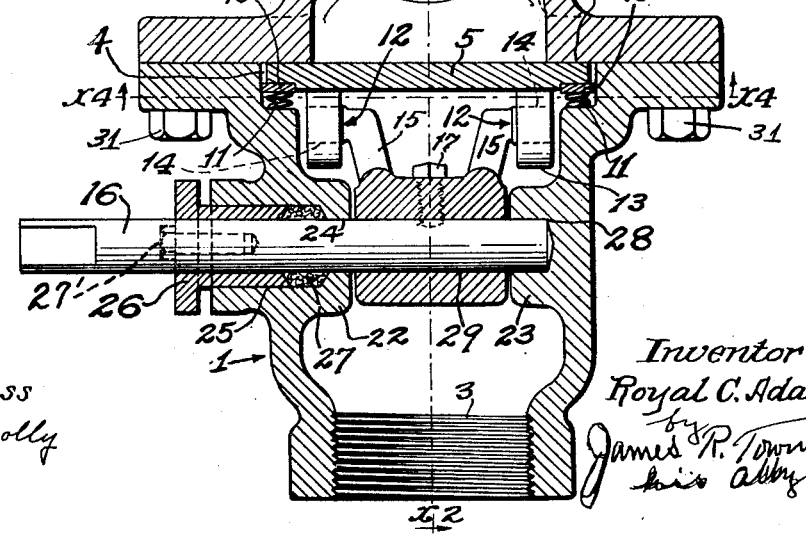

1,854,918

UNITED STATES PATENT OFFICE

ROYAL C. ADAMS, OF SAN GABRIEL, CALIFORNIA, ASSIGNOR TO TRUMBLE GAS TRAP CO., OF LOS ANGELES, CALIFORNIA, A COPARTNERSHIP CONSISTING OF MILTON J. TRUMBLE, A. J. GUTZLER, AND F. M. TOWNSEND

SWITCH VALVE

Application filed December 21, 1927. Serial No. 241,668.

This invention is applicable to various uses, but it more particularly provides for controlling and directing the flow of fluid under rock pressure from oil wells. In such service the pressures from the rock gas may range from moderate to very high and the oil and gas flow may range from gentle force and small volume to violent force and great volume. Various contrivances have been employed for separating the oil from the gas and conducting each fluid through separate conduits to appropriate destinations, such as tanks for the oil and holders for the gas.

It is necessary that the flow be switched from conduit to conduit, as occasion may require to prevent over-flow of the container to which the fluid is directed, and heretofore such switching has been done by two independent valve installations, in one of which the valve is to be closed while the other is opened, to deliver fluid to the tank that is to be filled, and vice versa when another tank is to be filled. At times it may happen through mistakes and inattention that both valves may be closed at the same time, thus stopping the flow from the well; and proper switching by one operating the two valves requires careful attention, and the work can be entrusted only to those capable of handling the valves according to the requirements.

In this invention I provide a shell formed of two members secured together by suitable means; one of said members constituting an open ended constant flow chamber adapted to be connected to the top of the flow pipe and the other member being in the form of a switch head having a partition and having on each side of said partition a port and an outlet way leading from said port to an outlet from the head; there being a valve seat formed across the ports and a closure way to receive a closure to fit the valve seat; I also provide a closure movable in said closure way and sliding on the valve seat and adapted to close one of the ports and leave the other one open when the closure is at one side of the chamber, and vice versa, when the closure is at the other side of the chamber; and I provide means to hold the closure against the valve seat, and means to slide the closure on the valve seat.

Another object of the invention is to minimize the cost of installation of the valve.

Another object is to attain ease and convenience of operation to avoid chattering of the valve.

An object of this invention is to provide a valve adapted to deliver fluid from one way to either one or both of two other ways and to change from delivery through one way to delivery through another way, and vice versa. without interfering with the flow through the inlet way to a final outlet.

An object of the invention is to make provision whereby gas-charged oil flowing from an oil well under rock pressure may be delivered to different separators and storage stations without interrupting the flow of oil and gas from the well.

Other objects are cheapness of construction and certainty of action.

Another object is to guard against leakage. A further object is to avoid displacement of parts by internal pressures.

Other objects, advantages and features of invention may appear from the accompanying drawings, the subjoined detailed description and the appended claims.

The accompanying drawings illustrate the invention.

Figure 1 is a detached perspective view of a valve constructed in accordance with this invention in one of its forms; a portion of the wall of the outlet ways being broken to expose the interior.

Fig. 2 is an elevation in section on a plane axial to the ways and transverse to the valve closure and its operating shaft; lines $x2$, Figs. 3 and 4 indicate the plane of section.

Fig. 3 is an elevation mainly in section on irregular line $x3$—$x3$, Fig. 2.

Fig. 4 is an inverted plan on line x4, Figs. 2 and 3.

1 is an open ended continuous flow intake chamber and 2 is a multiple discharge switch head therefor, fixed to and opening from the outlet end of the continuous flow chamber. The chamber 1 has its intake 3 threaded to screw onto a flow pipe, not shown, through which fluid flows from the well or other source toward storage or final delivery. The outlet end of the continuous flow chamber has a closure way 4 for a closure 5 that is movable by suitable means to close and open valve ports 6 and 6' alternately, either proportionally or fully.

7 is a partition in the discharge head between the valve ports 6, 6' and the same separates the discharge head into two out flow ways 8, 8', opening in opposite directions and threaded for connection to outlet pipes, not shown.

9 is a valve seat on the end of the head 2 and common to the ports 6 and 6', and against said seat the closure 5 is held by adjustable slide bars 10 pressed by springs 11, in the direction of the flow pressure to hold the valve fluid tight against the valve seat 9.

The valve closure is provided, in the chamber 2 with slot-like bearing means 12 formed between bearing lugs 13 and said bearing means accommodate the valve operating crank pins 14 carried by crank arms 15 that are fixed to the valve shaft 16 by the set screw 17.

The connection between the closure 5 and the crank shaft 16 is preferably formed by two pairs of bearing lugs 13 and a bifurcated crank arm 15 with a duplex crank pin 14 the members of which extend in opposite directions into bearing slots 12 formed between the lugs adjacent opposite edges of the closure.

In order to make the ports 6 and 6' respectively, of sufficient cross sectional area to accommodate the flow through the pipe, not shown, onto which the threaded connection 3 is screwed, said ports are enlarged by tangential extensions 18 on opposite sides of the partition 7 in the head 2, so that a large volume of fluid may pass into either of the outflow ways 8, 8' that terminate at their outer ends respectively in cylindrical connection 19 into which, outlet pipes not shown, are screwed, when the valve is installed for service.

When the device is installed, the outlets from the discharge ways 8, 8' may respectively equal the inlet into the chamber 2 formed by a pipe, not shown, screwed into the connection 3.

The valve closure 5 is shown provided at its sides with stops 20, 21 to prevent jamming of the closure, and to insure appropriate positioning of the closure when either of the ports is fully open and the other one fully closed.

The intake valve chamber 1 is provided with oppositely arranged valve shaft bearings formed by bosses 22, 23 projecting inwardly from opposite walls of the chamber; and being of corresponding dimensions inside the chamber 1. The boss 22 has therethrough a bore 24 to form a valve shaft bearing, and has an enlargement 25 to receive a gland 26 to compress and retain packing 27 around the valve shaft; said gland being secured in the usual manner by cap screws 27'.

Bearing 28 in the boss 23 receives the end of the shaft 16 that is inserted through the hub 29 of the crank arm 15 and when the handle 30 is applied to the outer end of the crank shaft 16 the operator has control of the valve.

By constructing the chamber and the head of two separate parts the slide-way for the valve and the accommodation for the closure and the means for holding it tight against the valve seat are easily gotten at to be machined before the head is secured to the chamber by the stud bolts 31.

I claim:

1. A switch valve comprising an element forming a continuous flow chamber having an intake for connection with a flow pipe of an oil well; a discharge head having a partition in the head forming distinct outlets; there being ports normally providing communication between the continuous flow intake chamber and the outlets of the head; a valve seat common to said ports; yieldingly mounted slide bars at said valve seat; a closure supported by said slide bars; a slotted bearing carried by the closure; a crank shaft for extension through the continuous flow chamber; a crank arm extending between said shaft and said bearings in the closure; an operating lever secured to the shaft outside the flow chamber and means for detachably uniting the discharge head with the intake chamber element.

2. The combination with a chamber having an inflow and two outflow ports; of a valve way extending across both outflow ports; a valve movable in said way; means for yieldingly supporting said valve; spaced pairs of lugs extending from said valve toward said inflow port; a crank arm having a pair of pins for respective engagement with the pairs of lugs; spaced bearings in said chamber; a shaft rotatably mounted in said bearings and extending outside said chamber; means within the chamber for fixing the crank arm to rotate with said shaft and an operating handle fixed to the shaft outside the chamber.

3. A switch valve comprising an open ended continuous flow intake chamber and a multiple discharge switch head therefor and means to connect the switch head to the chamber; said switch head being provided with a partition, and on each side of the partition, with a port and an outlet therefrom; the head being also provided with a seat for a closure for said ports; there being provided between the chamber and the head, a closure way; a closure in such closure way; means to hold the closure in position to close either of the ports fully or both partially at the different positions of the closure; crank means in connection with the closure to move the closure relative to the ports; a shaft extending through a wall of the chamber and fixed to the crank arm, and means outside of the chamber to operate the crank.

In testimony whereof, I have hereunto set my hand at Los Angeles, California, this 13th day of December, 1927.

ROYAL C. ADAMS.